(12) United States Patent
Lee

(10) Patent No.: US 9,536,067 B1
(45) Date of Patent: Jan. 3, 2017

(54) PASSWORD SUBMISSION WITHOUT ADDITIONAL USER INPUT

(71) Applicant: Bryant Christopher Lee, Bethesda, MD (US)

(72) Inventor: Bryant Christopher Lee, Bethesda, MD (US)

(*) Notice: Subject to any disclaimer, the term of this patent is extended or adjusted under 35 U.S.C. 154(b) by 184 days.

(21) Appl. No.: 14/588,459

(22) Filed: Jan. 1, 2015

Related U.S. Application Data

(62) Division of application No. 61/922,850, filed on Jan. 1, 2014.

(51) Int. Cl.
  *G06F 17/30* (2006.01)
  *G06F 21/31* (2013.01)
  *H04L 29/06* (2006.01)

(52) U.S. Cl.
  CPC .............. *G06F 21/31* (2013.01); *H04L 63/083* (2013.01)

(58) Field of Classification Search
  None
  See application file for complete search history.

(56) References Cited

U.S. PATENT DOCUMENTS

| | | | |
|---|---|---|---|
| 5,060,263 A | 10/1991 | Bosen et al. | |
| 5,638,513 A | 6/1997 | Ananda | |
| 6,050,717 A | 4/2000 | Kosugi et al. | |
| 7,694,147 B2 * | 4/2010 | Lott | G06F 21/31 713/183 |
| 7,752,326 B2 | 7/2010 | Smit | |
| 7,836,044 B2 | 11/2010 | Kamvar et al. | |
| 8,315,876 B2 | 11/2012 | Reuss | |
| 8,347,405 B2 | 1/2013 | Backhouse | |
| 8,365,245 B2 | 1/2013 | Childress et al. | |
| 8,502,780 B1 | 8/2013 | Park | |
| 8,555,359 B2 | 10/2013 | Manohar et al. | |
| 8,832,804 B1 * | 9/2014 | Casey | G06F 21/31 704/273 |
| 2002/0093530 A1 | 7/2002 | Krothapalli et al. | |
| 2002/0101988 A1 | 8/2002 | Jones | |

(Continued)

FOREIGN PATENT DOCUMENTS

| | | |
|---|---|---|
| EP | 1953663 | 6/2008 |
| EP | 2317709 | 10/2009 |

(Continued)

OTHER PUBLICATIONS

U.S. Appl. No. 14/455,894 to Bryant Lee.

(Continued)

*Primary Examiner* — Kenny Lin

(57) ABSTRACT

A computer system may have a password entry form with a text field for a user to enter a password. The computer may receive text input from the user and display the text input in the text field. In response to the text input of the user, and without additional input from the user besides the text input, the computer may submit the password for verification of correctness. In some embodiments, submission of the password for verification occurs after a trigger event, where trigger events include without limitation a threshold time elapsing from the most recent text input of the user, a threshold time elapsing from the most recent password submission, entry of a threshold number of text characters, "immediate" submission after entry or deletion of a text character, and so forth.

20 Claims, 5 Drawing Sheets

(56) References Cited

U.S. PATENT DOCUMENTS

| | | |
|---|---|---|
| 2003/0165240 A1 | 9/2003 | Bantz et al. |
| 2005/0216768 A1 | 9/2005 | Eppert |
| 2007/0186115 A1 | 8/2007 | Gao et al. |
| 2007/0234063 A1* | 10/2007 | Ueda ................ G06F 21/31 713/183 |
| 2008/0066167 A1* | 3/2008 | Andri ................ G06F 21/46 726/5 |
| 2008/0072302 A1 | 3/2008 | Parkinson |
| 2008/0077978 A1 | 3/2008 | Repasi et al. |
| 2009/0055654 A1 | 2/2009 | Dunn et al. |
| 2009/0119219 A1* | 5/2009 | Bleumer .......... G07B 17/00733 705/62 |
| 2009/0126018 A1* | 5/2009 | Keohane ................ G06F 21/46 726/23 |
| 2010/0002249 A1* | 1/2010 | Nuggehalli .......... G06F 21/554 358/1.14 |
| 2010/0180338 A1 | 7/2010 | Stewart et al. |
| 2010/0319059 A1* | 12/2010 | Agarwal ................ H04L 9/321 726/7 |
| 2011/0128247 A1* | 6/2011 | Sensu ................ G06F 3/0227 345/173 |
| 2011/0320552 A1 | 12/2011 | Friedman et al. |
| 2012/0142415 A1 | 6/2012 | Lindsay |
| 2012/0196571 A1* | 8/2012 | Grkov ................ H04L 63/14 455/411 |
| 2012/0226912 A1 | 9/2012 | King |
| 2014/0129974 A1 | 5/2014 | Ben-Harrush et al. |
| 2015/0172272 A1* | 6/2015 | Levner ................ H04L 63/083 726/7 |

FOREIGN PATENT DOCUMENTS

| | | |
|---|---|---|
| WO | WO0251049 | 6/2002 |
| WO | WO2013070124 | 5/2013 |

OTHER PUBLICATIONS

U.S. Appl. No. 14/517,841 to Bryant Lee.
Dashlane (http://www.dashlane.com).
1Password (http://agilebits.com/onepassword.com).
Google (http://www.google.com).
Pragati Ogal Rai, "Hashing Functions" in Android Application Security Essentials (Packt Publishing 2013).
Whitson Gordon, How Your Passwords are Stored on the Internet (and When Your Password Strength Doesn't Matter), Lifehacker (accesssible at http://lifehacker.com/5919918/how-your-passwords-are-stored-on-the-internet-and-when-your-password-strength-doesnt-matter) (accessed Dec. 27, 2013).
Davey Shafik, Lorna Mitchell, and Matthew Turland, PHP Master: Write Cutting-edge Code, Chp. 5.8 "Storing Passwords" (SitePoint 2011), Dec. 27, 2013.
Wikipedia, "Rainbow table" (accessible at http://en.wikipedia.org/wiki/Rainbow_table) (accessed Dec. 27, 2013).
Salted Password Hashing—Doing it Right (accessible at https://crackstation.net/hashing-security.htm) (accessed Dec. 31, 2013).

* cited by examiner

PASSWORD SUBMISSION WITHOUT ADDITIONAL USER INPUT

CROSS-REFERENCE TO RELATED APPLICATIONS

This application claims the benefit of U.S. Provisional Patent Application No. 61/922,850, filed Jan. 1, 2014, which is hereby incorporated by reference in its entirety.

FIELD OF THE INVENTION

The present invention relates generally to password submission and verification in computer systems.

BACKGROUND

Password systems may protect computer resources. In some systems, a text field is presented where the user may enter a set of text characters comprising a password. When the user is finished entering a password, the user must perform an action to submit the password. The action may be pressing a "submit button" or some other action like pressing the "enter" key on a keyboard. Generally, the user must do something to tell the computer to check the user's entry to verify that the password is correct.

It would be desirable for a computer system to submit the user's password for verification without additional input from the user. Such a novel system would be more convenient than current systems because the user would not need to perform an additional action to tell the computer system to check the password. In addition, such a novel system is potentially faster than current systems because the time for the user to perform an action to tell the computer system to check the password is not needed. Additional advantages of the embodiments described herein will be clear from the description herein below.

SUMMARY OF THE INVENTION

In an exemplary embodiment, a computer may present a password entry form having a text field for the user to enter a password. The computer may receive text input from the user and display the text input in the text field. In response to the text input of the user, and without additional input from the user besides the text input, the computer may submit the password for verification of correctness. In some embodiments, submission of the password for verification occurs after a trigger event, where trigger events include without limitation a threshold time elapsing from the most recent text input of the user, a threshold time elapsing from the most recent password submission, entry of a threshold number of text characters, "immediate" submission after entry or deletion of a text character, and so forth.

Thus, in some embodiments, a computer may submit the password for verification in response to text input of the user and without an explicit notification from the user of when the user has completed entering the password, and a password may sometimes be submitted repeatedly (e.g., more than once) as the user continues to edit the text in a password submission field. In some embodiments, submission of the password for verification may occur one or more times before the user has completed entry of the password. Some password submissions may be incorrect, but, when a correct password is verified, the computer may log in the user.

In accordance with these exemplary techniques, a desirable effect may be achieved in some embodiments where the user may enter text characters in a password form and the computer "automatically" verifies and logs in the user once the correct text is in the password form and without the user having to perform an additional action such as activating a "submit button." The term "automatically" is used in this patent to mean "without additional user input (e.g., without activating a 'submit button' or pressing an 'enter' key)."

Embodiments of the invention may be used entirely on a local computer or across multiple computers in a network environment.

Embodiments of the invention may determine the correctness of a submitted password using various techniques including without limitation plaintext comparison, use of password hashes with optional salts, and so forth.

The aforementioned embodiments are just examples and a number of additional examples and features are described herein below.

DETAILED DESCRIPTION

I. Overview and Definitions

Figure 1:
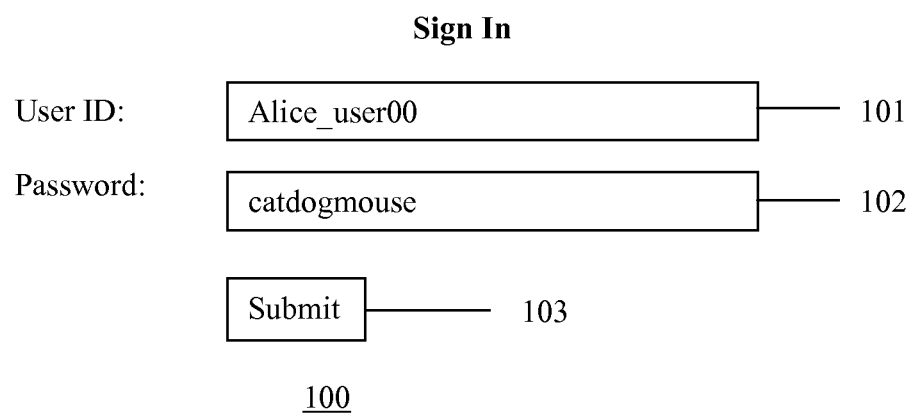
FIG. 1 illustrates an exemplary password entry form having a user ID field, password field, and submit button.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment. Further, some steps may be performed in part by one component in a network and other parts of the step may be performed by other components on the network. All method steps should be considered optional unless explicitly stated otherwise.

Embodiments of the invention may comprise one or more computers. Embodiments of the invention may comprise software and/or hardware. Some embodiments of the invention may be software only and may reside on hardware. A computer may be special-purpose or general purpose. A computer or computer system is defined to include without limitation personal computers, desktop computers, laptop computers, mobile devices, cellular phones, smart phones, PDAs, pagers, multi-processor-based devices, microprocessor-based devices, programmable consumer electronics, tablets, minicomputers, mainframe computers, server computers, microcontroller-based devices, DSP-based devices, embedded computers, wearable computers, electronic glasses, computerized watches, any devices executing instructions on a processor or CPU, and the like. A computer or computer system is further defined to include distributed systems, which are systems of multiple computers (of any of the aforementioned kinds) that interact with each other, possibly over a network, to achieve a goal (a goal includes performance of a method). Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed and/or executed by a processor. Memory is storage for instructions or data. Memory includes temporary, semi-permanent, and permanent storage.

A computer program is software that comprises multiple computer executable instructions. The term "computer program" includes any sequence of instructions. The term includes, for example, a software module. The term "computer program" is not limited to "separate" or "self-contained" computer programs.

Methods described herein may be performed by a computer executing computer programs comprising one or more computer executable instructions stored on a computer-readable medium. Therefore, any method described herein also discloses one or more computer readable mediums comprising instructions for performing the method.

Computer systems may have a processor, memory, a display, and peripherals like a keyboard, mouse, a USB port, a wireless communications unit, a network card, a Bluetooth controller, and so forth. The memory of a computer system may store instructions for execution.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements. Connection includes communication connections and not just physical connections. For example, two components can be connected by wireless connection even though not physically connected.

The term "associated with" means that two items are directly or indirectly linked. To store an item "associated with" another item means to store the items so that they are directly or indirectly linked. If item A is "associated with" item B and item B is "associated with" item C, then this would imply that item A is "associated with" item C (e.g., by indirect linkage).

The term "present" encompasses various mechanisms for causing the display of information. "Present" includes actions by a local computer to cause the display of information, such as calling a function that causes information to be displayed to the user at the local computer. "Present" also includes actions by a remote computer connected to the local computer over a network that cause information to be displayed on the local computer; for instance, "present" includes the remote computer sending a web page to the local computer that the local computer displays and "present" also includes the remote computer sending data or instructions to the local computer that causes the local computer to display information. Thus, a remote computer may "present" information, data, documents, web pages, and so forth on a local computer.

The term "display" likewise includes actions by a local computer to directly display information and also actions by a remote computer to indirectly display information via the local computer.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y. As a real world example, to perform an action, say providing an umbrella, "based on" the fact that it is raining or make a decision "based on" the fact that it is raining does not preclude the fact that the action or decision may also be based on additional information, such as the fact that it is Monday and the user must go to work rather than just staying home. The term "based on" should be given a broad meaning because it can be very difficult to enumerate all possible factors that may influence an entity's actions or decisions.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

The above definitions should also be applied to common variations of the above terms. For example, "presenting," "presented," and other variations of the term "present" should be construed consistently with the above definition of "present." Likewise for "display," "transmit," "send," "receive," "connected," "coupled," "associated," "based on," and other relevant terms, including the terms listed in the above paragraphs.

Some embodiments of the invention relate to use of the Internet. The Internet is a system of interconnected computer networks, which allows computer systems on the Internet to communicate with each other. Computers may communicate according to certain services on the Internet such as electronic mail and the World Wide Web (WWW or "the web"). The WWW service is a system of interlinked hypertext documents. Documents on the web can be viewed with web browsers or other web-enabled applications. Web pages, text, images, videos, and other multimedia are all types of media that can be accessed in a web browser and other web-enabled applications. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser or other web-enabled application. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function.

II. Exemplary Methods

This section describes some exemplary methods that may be used in some embodiments of the invention.

FIG. 1 illustrates an exemplary password entry form 100 that may be used in some embodiments. In response to the user requesting to access a computer resource or network resource, a computer system may present password entry form 100 requiring the user to authenticate him or herself with a user ID and password. A user ID may be of various forms including an email address, phone number, name, or other information or may be, for example, a text string of no significance other than as a user ID.

A computer resource is a resource for use by a computer. A network resource is a resource on a network. Some computer resources may be network resources, and some network resources may be computer resources.

Some exemplary computer and network resources include websites, servers, databases, file systems, computer devices on a network, and so forth. Memory, programs, files, and computer components can also be computer and network resources.

A user ID field 101 may accept entry of text from the user and display it. A password field 102 may accept entry of text from the user and display it. In some cases, a password field 102 may mask text entered into the field to protect it from other people in the vicinity who may observe the user's computer screen. For example, characters in the password field may appear as nondescript bullet character such as "*" rather than the actual text entered by the user. To fill in the user ID and/or password fields, the computer system may detect characters input by a user via a keyboard and display the characters in the appropriate field. A keyboard includes without limitation (a) physical keyboards, (b) virtual keyboards that are displayed on a screen, and (c) any other keyboards. The computer may fill in the user ID and/or password fields in other ways, for example in response to entry of text by a voice recognition system that converts spoken characters from the user into text, in response to entry of text by a gesture recognition system, or by other techniques.

Text characters that may be part of a user ID or password in some embodiments include without limitation letters, numbers, and special characters. Special characters may include, for example, "!", "@", "#", "$", "%", and so forth. Some password systems specify that only certain special characters may be used. A password system may indicate to the user what kinds of text characters it will accept as part of a user ID or password. Embodiments are not limited to English but may use other languages.

In some embodiments, a password entry form may have a submit button 103. A submit button 103 may be labeled in various ways—for example, it may labeled "sign in" or "log in" or various other labels.

The submit button 103 is optional because some embodiments will submit the password entry form without requiring activation of the submit button 103 by the user. The submit button 103, when present, may be used to submit the user ID in the user ID field 101 and password in the password field 102 for verification by a computer system. Other features may be included for manual submission of the user ID and password. For example, the user ID and password may be manually submitted in response to the user pressing a key such as "enter" on a keyboard, in response to a voice command such as "log in," in response to a gesture by the user, or in response to other user input. These are various forms of "manual" submission that may be used in addition to the "automatic" (without additional user input) methods that are also herein described.

Figure 2:
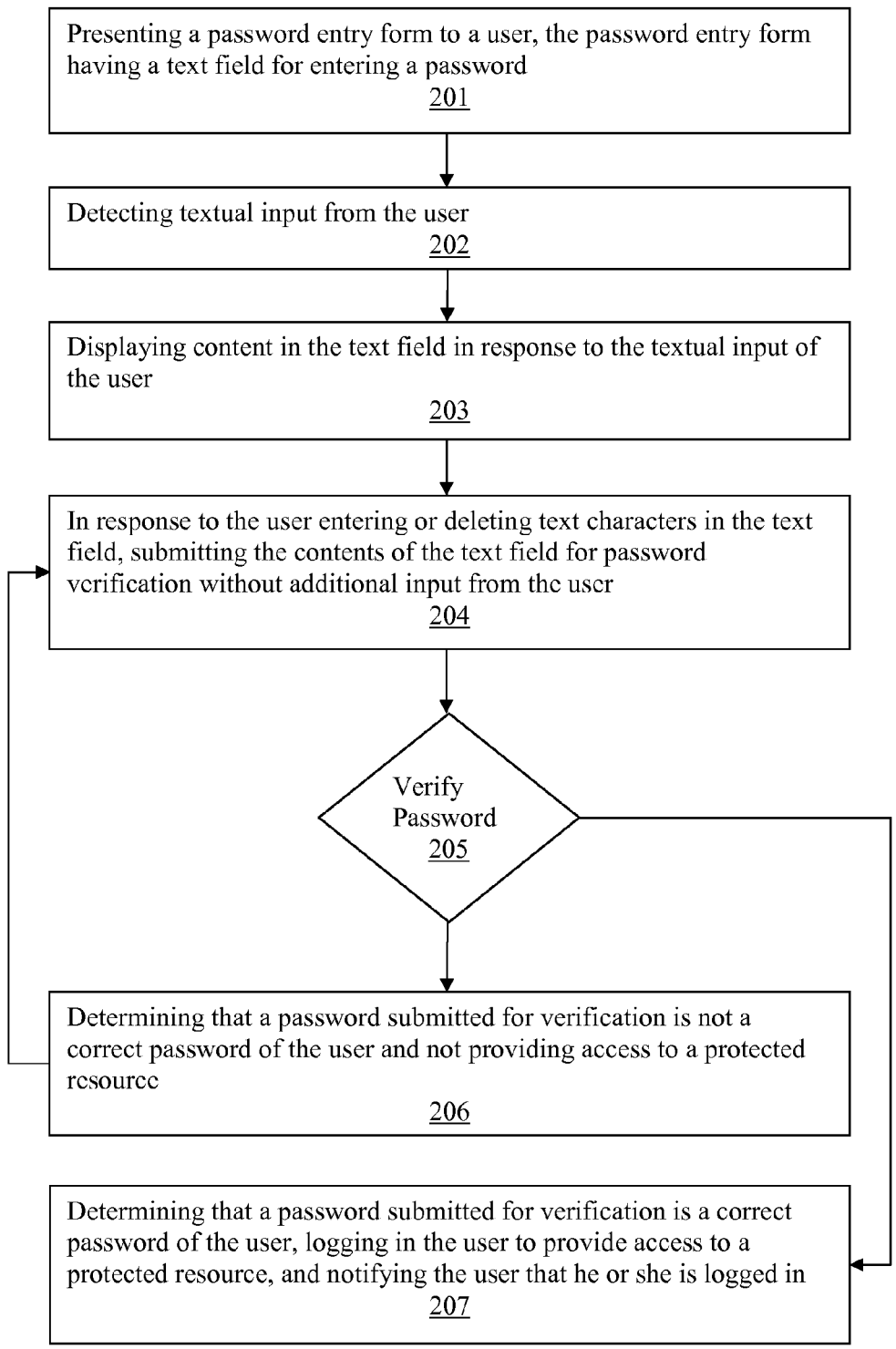
FIG. 2 is a flow chart illustrating an exemplary method of submitting and verifying a password.

FIG. 2 illustrates an exemplary computer-implemented method 200 for submitting and checking a password without additional user input that may be performed in some embodiments. The method 200 may be performed in response to the user requesting a protected resource such as a computer resource or network resource, and the user may be required to enter correct password information to obtain access to the protected resource.

The method 200 includes presenting a password entry form to a user, the password entry form having a text field for entering a password (act 201). For example, exemplary password entry form 100 may be displayed to the user. As described with respect to form 100, the computer may detect text character input from a keyboard by the user, or may detect character inputs by other modes such as voice recognition or gesture input (act 202). In response, the computer may display textual characters in the text field, such as the actual characters entered by the user or masked characters (act 203).

In response to the user entering or deleting text characters in the text field, the computer may submit the contents of the text field and/or user ID field for password verification (act 204). The step 204 may be performed without additional user input besides the user entering or deleting text characters in the text field. Specifically, the step 204 of submitting the contents of the text field and/or user ID field for password verification may occur without the user pressing a "submit button," pressing an "enter" key or other designated submission key of a keyboard, issuing a voice command to submit a form, performing a submit gesture, or any other user action other than modification of the contents of the text field.

Since the step 204 may be performed without an explicit indication from the user as to the user having completed entry of his or her password, the step 204 may be performed repeatedly (e.g., more than once) in response to the user making changes to the contents of the text field. In addition, in some cases, the step 204 may be performed one or more times before the user has completed entry of his or her password in the text field. However, in other cases, based on configuration as described later, the password might only be submitted once and only after the user has completed entry of his or her password in the text field.

As one example of step 204, suppose that the user's password is "catdogmouse" as shown in form 100. Suppose that the user has already entered "catdogm." Then, the user enters "o" and the text field displays "catdogmo." At that point, the computer may submit the user ID and/or password for verification despite the fact that the user has not yet completed entry of his or her password.

Further, if the user enters "u" thus yielding "catdogmou", then the computer may again submit the user ID and/or password for verification, which illustrates that the system may submit the user ID and/or password repeatedly in response to the user making changes to the contents of the text field.

In addition, some embodiments may submit a password for verification after the user deletes one or more characters. For example, suppose that the user has entered "catdhogmouse." Note that the "h" is inadvertent and causes the password to be wrong. In response to the user deleting the "h," the computer system may submit the password for verification.

However, submitting a password and/or user ID in response to receiving entry of an "enter" key or other designated submission key of a keyboard that explicitly indicates that the user wishes to submit the contents of the password form is not "in response to the user entering or deleting text characters in the text field, submitting the contents of the text field for password verification without additional input from the user." The "enter" key or other designated submission key does not enter a character into the password field (for example, there is no "enter key" character input into the password field), rather it only indicates to the computer that the user has completed entering his or her password. Thus, an "enter" key or other designated submission key of a keyboard is an "additional user input" besides the user entering or deleting text characters in the text field.

Some embodiments do not submit a password for verification in response to deletion of text characters and only submit a password for verification in response to a user entering characters. Since step 204 specifies that submission may occur in response to the user entering "or" deleting text characters, step 204 encompasses embodiments that submit only in response to entering characters, that submit only in response to deleting characters, or that submit in response to either entering or deleting characters.

In step 204, some embodiments may submit the contents of the password field and/or user ID field after entry of each character in the password field, or after deletion of any character in the password field, or after entry of each character and deletion of any character in the password field. These embodiments may be referred to as "immediately" submitting the contents of the password field and/or user ID field for verification. "Immediately" does not mean without any delay whatsoever as the physical limits of computers would practically require that some delay likely occur between entry of text and its submission. "Immediately" in this context means without the computer explicitly waiting a threshold time.

However, other embodiments use additional triggers before submitting the contents of the password field and/or user ID field as described below.

In one embodiment, the password verification system and password entry form are configured to accept passwords of only a set length. For example, all passwords may have to be of length 4. Other possible set lengths include without limitation 1, 2, 3, 5, 6, 7, 8, 9, 10, 11, 12, 13, 14, 15, 16, 17, 18, 19, 20, and so on. Thus, once the user has entered a text string (a string is a sequence of characters) of the set length in the password field, the computer system may submit the password and/or user ID for verification.

In other embodiments, the password verification system and password entry form are configured to accept passwords of variable length. For example, the password system may accept passwords of length 6-20 characters. Some embodiments may accept passwords of length at least 4, at least 5, at least 6, at least 7, at least 8, at least 9, at least 10, at least 11, at least 12, at least 13, at least 14, at least 15, at least 16, and so on. Some embodiments may have a maximum character length of a password such as 8, 9, 10, 11, 12, 13, 14, 15, 16, 17, 18, 19, 20, or so on.

In one embodiment, the computer checks that a threshold time has elapsed from the most recent edit to the text field (e.g., entry or deletion of a text character) before submitting the contents of the password field and/or user ID field for password verification in step 204. Some embodiments may require that a threshold time elapse from entry of a text character and may not count deletions of text characters as an edit.

One advantage of waiting a threshold time from the most recent edit is that it cuts down on the number of password checks that the system must perform. In network embodiments, it may also cut down on the number of transmissions of password candidates over the network. In some systems it would be expected that the user will pause or stop once he or she has finished entering his or her password and therefore it would make sense to verify the password at that time. If there is only a small time between keystrokes then it may indicate that the user is still editing the password and there is no reason to verify the password as yet. Thus, in one example, if the user types "catdogm" in the text field and pauses for a threshold time before entering additional characters or deleting a character, then the computer system may submit the entry "catdogm" for password verification. On the other hand, if the time elapsed from the most recent edit does not exceed the threshold time, then the computer might not submit the password for verification. For example, if the user pauses, but then enters another character before the threshold time has elapsed, then the computer system might not submit the password for verification because an intervening edit was made before the threshold time elapsed.

Various threshold times may be used. For example, in some embodiments, the threshold time may be for example 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, or 2500 milliseconds. In some embodiments, the threshold time may be chosen to be a value between 100-1000 milliseconds, 100-500 milliseconds, 500-1000 milliseconds, 1000-1500 milliseconds, 1500-2000 milliseconds, 2000-2500 milliseconds, 2500-3000 milliseconds, 200-600 milliseconds, 200-800 milliseconds, 300-600 milliseconds, 300-800 milliseconds, 1-3 seconds, 3-5 seconds, 0-1 seconds, 0-1.5 seconds, 0-2 seconds, 0-2.5 seconds, 0-3 seconds, 0-3.5 seconds, 0-4 seconds, 0-4.5 seconds, 0-5 seconds, 1-2 seconds, 2-3 seconds, 3-4 seconds, 1-4 seconds, 2-4 seconds, or may be chosen in various other ranges.

In another embodiment, the computer may submit the contents of the password field and/or user ID field at various time intervals. For example, the computer may set a timer that counts to a certain time (or equivalently counts down from a certain time) and at expiration of the timer may submit the contents of the password field and/or user ID field for password verification. The computer may count time starting from the expiration of the last timer or from the last submission of a password or from various other times. In some embodiments, the computer may check whether the contents of the password field have been edited by the user since the last submission before causing the submission for password verification.

In addition, some embodiments may only submit the contents of the password field and/or user ID field for password verification if the contents of the password field meet or exceed a certain threshold length of characters. For example, if the password verification system only accepts passwords of length 6 or more, it may be desirable to only submit passwords for verification that are length 6 or more. Examples of various threshold lengths that may be used include without limitation 1, 2, 3, 4, 5, 6, 7, 8, 9, 10, 11, 12, 13, 14, 15, 16, 17, 18, 19, 20, and so on.

Thus, in embodiments that check for a threshold time elapsing from the most recent edit, the computer may check both that the contents of the password field meet or exceed a threshold length and also that a threshold time has elapsed from the most recent edit before submitting the contents of the password field and/or user ID field for password verification in step 204.

Also, in embodiments that check for expiration of a time interval, the computer may check both that the contents of the password field meet or exceed a threshold length and also that a threshold time interval has expired before submitting the contents of the password field and/or user ID field for password verification in step 204.

Further, in embodiments that are configured to submit a password for verification after entry of each character, after deletion of any character, or after entry of each character and after deletion of any character, the computer may additionally require that the contents of the password field meet or exceed a threshold length before submitting the contents of the password field and/or user ID field for password verification in step 204.

Figure 3:
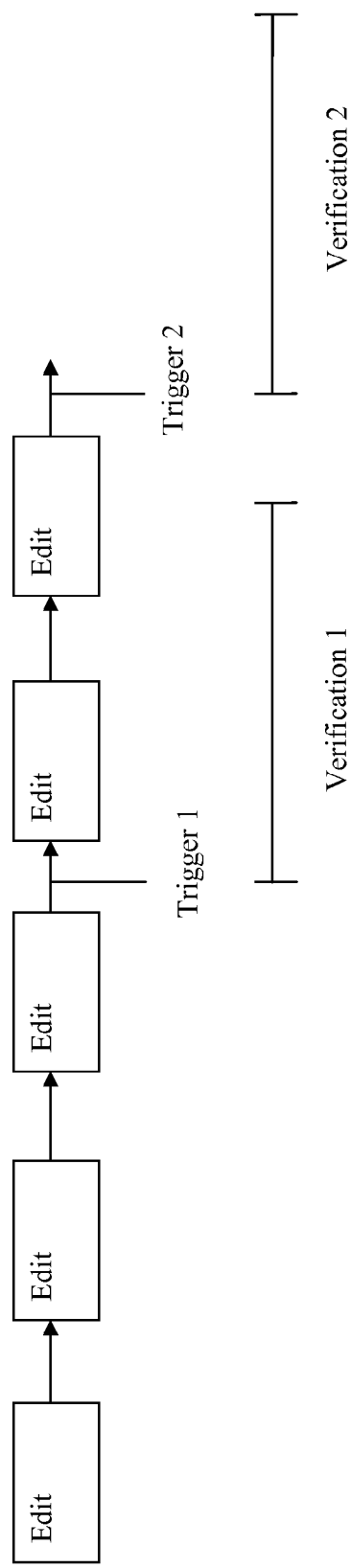
FIG. 3 illustrates exemplary submission and verification of a password in some embodiments.

FIG. 3 illustrates some of the concepts described in the above paragraphs related to step 204. In this example, a series of "Edit" boxes are shown representing edits made by the user in the password field. A "Trigger 1" event indicates that a trigger has caused submission of the password field and/or user ID field for verification. The trigger may be of any of the types discussed above. In response to the "Trigger 1" event, a "Verification 1" step is performed to verify the password and/or user ID. Meanwhile, the user may continue to edit the contents of the text field as shown by the two additional "Edit" boxes.

Thus, as shown in the figure, in some embodiments, submission of the contents of the password field and/or user ID field for verification may occur while the user is still in the process of editing the password field. As shown, in some embodiments, verification of the password and/or user ID may be performed by the computer in parallel with (e.g., simultaneously or concurrently with) continuing to receive edits to the password field from the user and continuing to update the display of the contents of the password field according to the received edits.

As further shown in FIG. 3, a "Trigger 2" event indicates a second trigger event, which may cause submission of the password field and/or user ID field for verification. Although FIG. 3 only shows two exemplary trigger events, many more trigger events may occur causing many submissions of the password field and/or user ID field for verification. Although only the "Verification 1" step is illustrated being performed in parallel with continuing to receive and display edits from the user, the "Verification 2" step and additional verification steps may also be performed in parallel with continuing to receive and display edits from the user.

Further, in some embodiments, verification steps such as "Verification 1" and "Verification 2" may be performed by the computer in parallel. This may occur in FIG. 3, for example, if "Verification 1" took a longer time than as illustrated and overlapped with "Trigger 2." In that case, the contents of the password field and/or user ID field may be submitted for checking in the "Verification 2" step, and the "Verification 2" step may be initiated and performed (in some embodiments) while the "Verification 1" step was still being processed. Other verification steps such as the "Verification 2" step and a "Verification 3" step following a third trigger might also be performed in parallel in some embodiments.

In addition to step 204, which may submit the contents of a password field and/or user ID field "automatically" (without additional user input), some embodiments may also allow for manual submission of the password and/or user ID for verification. Manual submission may occur in response to a user input indicating that the user has completed entry of a password for submission. For example, a user input indicating a desire for submission may include pressing a "submit button," pressing an "enter" key or other key on a keyboard, a user issuing a voice command that the computer recognizes via voice recognition, a user making a gesture that is recognized by a gesture recognition system of the computer, or other user inputs. Thus, in response to a user input, the computer may submit the contents of a password field and/or user ID field for verification as described above.

Manual submission may be desirable in some embodiments since users may not be adjusted to "automatic" password submission. Also, some embodiments (described further below) may limit the number of "automatic" password submission that may be tried and so manual submission may be required at some times.

In response to the computer submitting the contents of the password field and/or user ID field for verification, the computer (or other computers) may verify the correctness of the password (act 205). Verifying the correctness of the password may involve the computer using the user ID to access the password information of the user, for example from a database storing, inter alia, user accounts or other information. Password information may be stored in various ways, including without limitation in plain text form or through the storing of a hash of the password with optional salt.

In verifying the password, the computer may determine that the password submitted is not a correct password of the user and, as a result, not provide access to the requested protected resource (act 206). The computer may also optionally display a notification to the user that the password was incorrect. However, in some embodiments, the computer does not display a notification that the password was incorrect; such an approach may be desirable since the user may not even know that the password was submitted for verification because the password may be submitted automatically ("without additional user input"). A notification that a password submission was incorrect may confuse the user in that case, and, therefore, some embodiments would not provide a notification that the password was incorrect.

Further, some embodiments may provide a notification that a password was incorrect if the password form was manually submitted, but not provide a notification that a password was incorrect if the password form was automatically submitted. Such an approach may be desirable for the same reasons described above, namely that a user may be confused by an incorrect password message if the user did not explicitly submit the password.

After or in parallel with step 206, the computer may continue to display the password entry form (act 201) and continue to receive and display edits made in the password field (acts 202, 203). In addition, the computer may again, in response to the user entering or deleting text characters in the text field, submit the contents of the password field and/or user ID field for password verification without additional input from the user (act 204). As described previously, in some embodiments, the contents of the password field and/or user ID field may be submitted repeatedly as the user continues to edit the password field. In some cases, the contents of the password field and/or user ID field may be submitted one or more times before the user has completed entry of his or her password in the password field.

Thus, the computer (or other computers) may again verify a password submission (act 205) in response to an automatic ("without additional user input") or manual submission of the password entry form. Sometimes the password may be determined to be incorrect (act 206) and other times the password may be determined to be correct (act 207). If the computer determines that the password submitted for verification is a correct password of the user, the computer may log in the user to provide access to the protected resource, and optionally notify the user that he or she is logged in (act 207).

The act of "notifying the user that he or she is logged in" may be performed in many ways. It may be performed with a display of information that explicitly or implicitly indicates that the user is logged in. Similarly it could be explicitly or implicitly conveyed through audio. Further, "notifying the user that he or she is logged in" may be performed in some embodiments by the computer simply continuing processing because the user may expect a rejection screen if he or she was not successfully logged in. Therefore, by continuing processing, the computer may notify the user that he or she is logged in.

Method 200 is exemplary, and all steps should be considered optional unless explicitly stated otherwise. Steps may be performed in different orders than shown and also may be performed in parallel. Further, some steps may be performed by different computers in a network environment.

In addition, it should be understood that the method 200 differs from systems that merely store passwords and retrieve them for entry into a password field without human intervention. Such systems include Dashlane (http://www.dashlane.com) and 1Password (http://agilebits.com/onepassword). In those systems, a user may store a previously entered password. At a later time, the computer may retrieve a stored password, enter it into a password form, and submit the form without human intervention other than a sometimes required confirmation that the user wants to log in. However, the method 200 does not relate to storing and retrieving a password for entry. Rather, the method 200 may submit a password automatically as the user is entering it into a password field. Thus, some embodiments of method 200 would not store the password of the user, would not retrieve the password of the user for entry into a password field, and/or would not submit the password form after retrieving the password of the user without human intervention. The potential advantages of not performing those actions include: (a) not storing the password is more secure because a stored password may be stolen by a hacker, (b) the method 200 may be performed the first time a user is entering a password and does not require that the user has first stored the password, (c) method 200 may be simpler and easier to use, in some cases, than password storage systems because embodiments of method 200 do not appear to require extra effort from the user, such as storing and retrieving passwords, (d) password storage systems often require a master password or other authenticating information from the user before allowing the user to use his or her stored passwords whereas embodiments of method 200 may not require that inconvenience, and (e) if a user leaves him or herself logged into a password storage system, then any user of the computer may be able to use any of the user's passwords, whereas embodiments of method 200 may not suffer that disadvantage.

Nonetheless, method 200 may be used in systems that have password storage/retrieval services. One could, for example, store passwords for later retrieval and entry into a password form but still use method 200 when not using the password storage/retrieval service to enter a password into a password form without human intervention.

Further, it should be clear that method 200 differs from instant search systems such as those described in U.S. Pat. No. 7,752,326 and U.S. Pat. No. 7,836,044 and currently used on Google.com. An instant search system is a type of search engine. In an instant search system, a user may enter a partial search query, and the search engine may predict the remainder of the query and present search results for one or more predicted queries to the user. Method 200 differs from an instant search system because method 200 is not a search engine for retrieving and presenting search results to a user before the user has completed entry of a search query. Method 200 relates to a password submission and verification system. It is not directed towards searching for and returning information to the user; instead, it is directed to protecting access to a computer resource by determining whether to log in a user or not. And, meanwhile, instant search systems do not relate to submitting and verifying passwords.

Nonetheless, method 200 may be used as a password submission system that protects access to or logs a user into a search engine or other search retrieval system.

III. Exemplary Local and Network Environments

Some embodiments of the invention may operate entirely in a local computer, while other embodiments may operate in a network environment.

In some embodiments, method 200 may be performed entirely on a local computer. Thus, steps 201-207 may be performed locally. In step 201, the computer may present a password form that is stored on the computer system in the form of code or another representation. The computer may detect textual input and display the textual input in a text field for entering a password (acts 202, 203). In response to the user entering or deleting text characters in the text field, the computer may submit the contents of the text field and/or the contents of a user ID field for verification (act 204). The submission of the password and/or user ID may be to a verification program or module on the computer for verifying the password (act 205) to determine if it matches a correct password of the user (acts 206, 207). If the password is correct, the local computer may log in the user and grant access to a protected resource.

Figure 4:
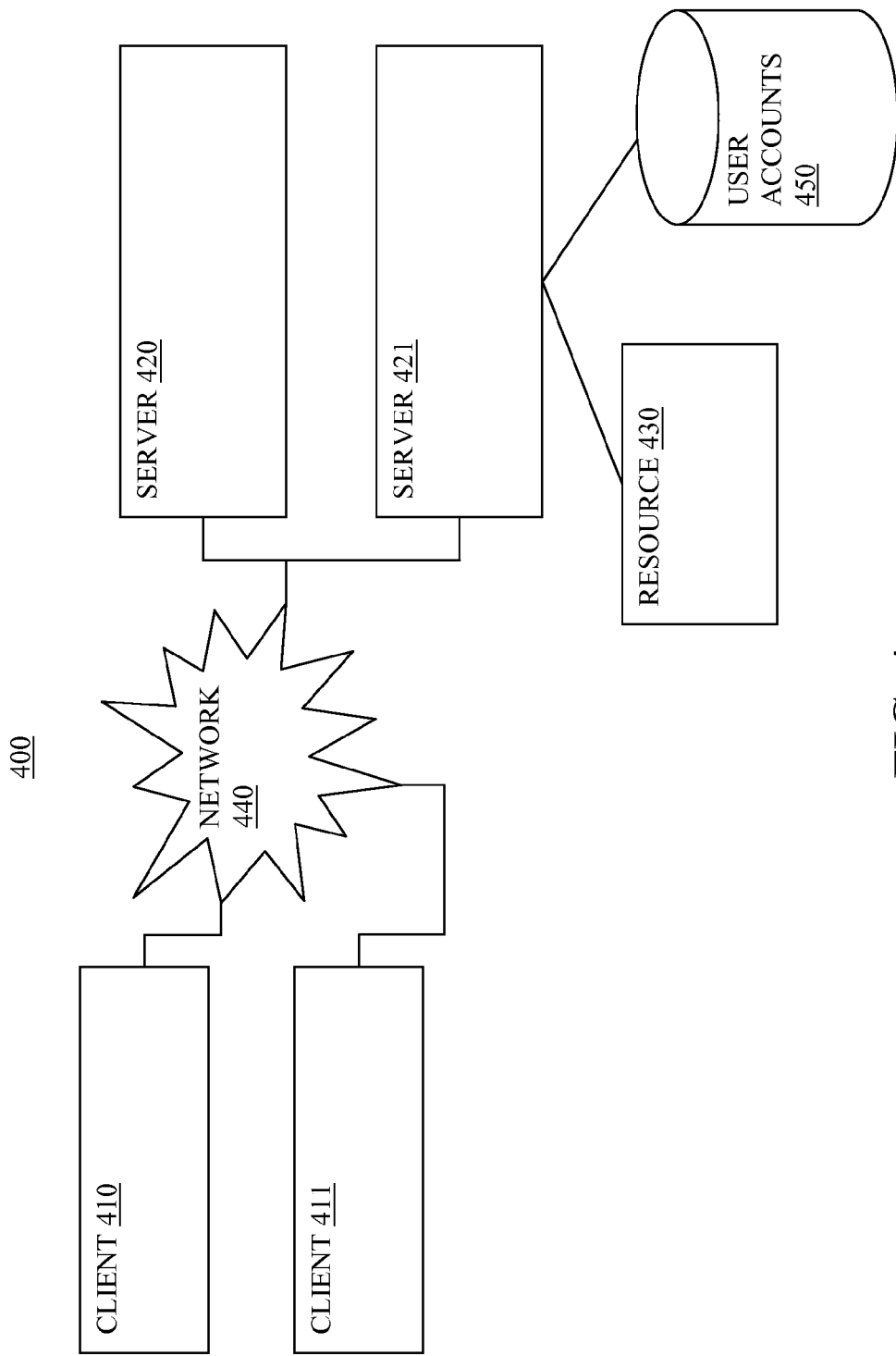
FIG. 4 illustrates an exemplary network embodiment where some embodiments may operate.

In some embodiments, method 200 and the like may be performed in a network environment. FIG. 4 illustrates an exemplary network environment 400 where some embodiments of the invention may operate. The network environment 400 may include multiple clients 410, 411 connected to one or more servers 420, 421 via a network 440. Network 440 may include a local area network (LAN), a wide area network (WAN), a telephone network, such as the Public Switched Telephone Network (PSTN), an intranet, the Internet, or a combination of networks. Two clients 410, 411 and two servers 420, 421 have been illustrated for simplicity, though in practice there may be more or fewer clients and servers. Clients and servers may be computer systems of any type. In some cases, clients may act as servers and servers may act as clients. Clients and servers may be implemented as a number of networked computer devices, though they are illustrated as a single entity.

In exemplary environment 400, the server 421 includes a resource 430 that a client 410, 411 may wish to access. A client may transmit a request over network 440 to server 421 to request access to resource 430. The request may include an indication of the identity of the resource 430 and a type of access requested. Resource 430 may be a computer or network resource of various types. Just as a few non-limiting examples, resource 430 may be a website, a computer program on the server 421, a file on the server 421, a database, a file system, a device on network 440 or another network, other servers, or other resources.

The server 421 may also include a user accounts database 450 containing user account information. The user accounts database 450 may include user password information that the server may use to verify whether submitted passwords are correct or not. The user accounts database 450 may allow retrieval of user information (including password information) based on a user ID or other keys. Database 450 may be implemented as a network of multiple databases.

Figure 5:
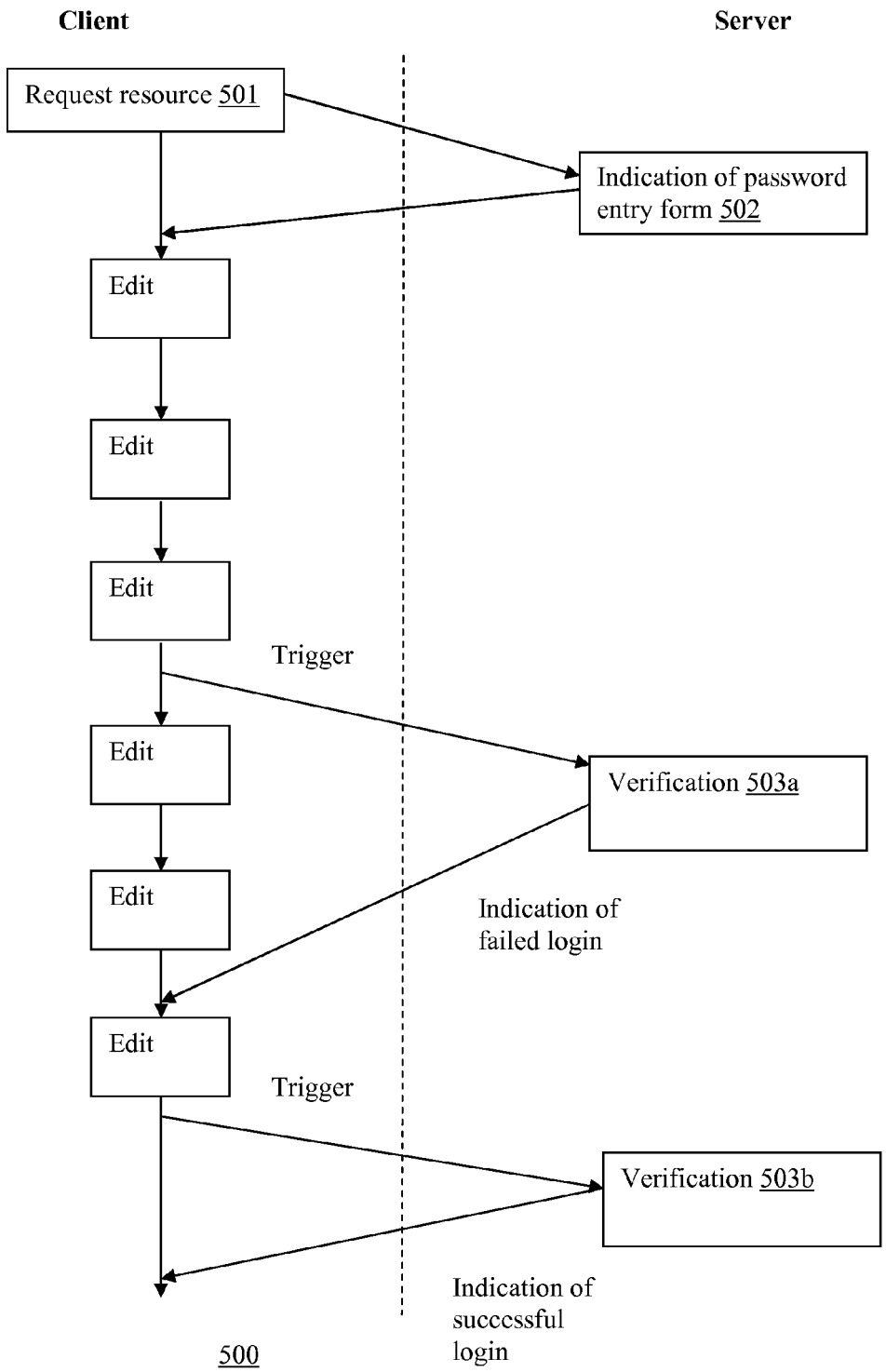
FIG. 5 illustrates exemplary submission and verification of a password which may occur over a network in some embodiments.

FIG. 5 is a schematic diagram 500 of an exemplary processing sequence that may occur in a network embodiment. A client 411 may request a resource 430 from the server in step 501. The client may transmit to the server 421 an indication of the requested resource and the type of access requested. In some embodiments, transmission between the client and server may use the HTTP protocol, and the client request may be an HTTP request. (In this patent, HTTP variants such as HTTP Secure (HTTPS) shall also be considered to be a type of HTTP, and HTTPS requests and responses shall be considered to be types of HTTP requests and responses.)

The server 421 may process the client's request and may transmit an indication of a password entry form to the client in step 502. For example, the server may send an HTML webpage comprising a password entry form to the client, or may transmit a password entry form to the client using other forms of code or other data representations.

In other cases, the password entry form may already be on the client in the form of code or other data representations, and the client may load the password entry form from its own memory. Also, in such an embodiment, the client might not send a resource request 501 until after the user has been shown the password entry screen and has entered at least part of a password.

Once the client computer has displayed the password entry form, with a password entry field and optional user ID field, the user may edit the password entry field as shown by the "Edit" blocks on the left side of diagram 500. As has been previously described, a trigger condition may be met and the client computer may submit the contents of the password field and/or user ID field for password verification. In a network environment 400, submission of the contents of the password field and/or user ID field may involve transmitting the contents of the password field and/or user ID field to the server.

Transmissions between the client and server may be encrypted using asymmetric key cryptography (e.g., public key cryptography), symmetric key cryptography (e.g., private key cryptography), a combination of asymmetric/symmetric key cryptography, or other cryptographic schemes. Some encryption schemes that may be used include Transport Layer Security (TLS), Secure Sockets Layer (SSL), and HTTP Secure (HTTPS). In a TLS/SSL style implementation, a client may receive a certificate from a certificate authority validating a server's public key and the client and server may use public key cryptography to establish or exchange a symmetric key. For example, the client may send a symmetric key to the server after encryption with the server's public key. The server may decrypt the message using its private key. Once the symmetric key is established, the client and server may encrypt their communications using the symmetric key (e.g., symmetric cryptography). The client and server may each read encrypted messages by decrypting them using the symmetric key.

As shown in diagram 500, the server may receive an indication of the contents of the password field and/or user ID field from the client and verify them in a verification step 503a. The server may use the user ID to look up correct password information of the user from a database such as user accounts database 450. The correct password may be stored in various ways, including plaintext or through use of a hash with optional salt. The server may compare the password with the password information to determine whether the submitted password is correct. In this example, supposing that the password is incorrect, then the server may send an indication of failed login to the user. In some embodiments, this may be an HTTP response. The transmission from the server to the client may take various forms and may be encrypted. In response to receiving an indication of failed login, the client may or may not display a message to the user indicating that the login attempt failed. Since the login failed, the server may decline to provide access to the requested resource 430.

As shown in diagram 500, the client computer may continue to receive edits from the user in the text field and update the display of contents of the text field in parallel with (e.g., simultaneously or concurrently with) the server verifying the correctness of the password (act 503a).

As shown in diagram 500, in this example, a second trigger event occurs and the contents of the password field and/or user ID field are again transmitted from the client to the server. The server may then verify whether the password is correct in verification step 503b. In this case, supposing that the password is correct, then the server may transmit an indication to the user that the login was successful. In some embodiments, this may be an HTTP response. Further, if the client and server are operating over the World Wide Web, then the server may send to the client a new web page for the client to display. In other embodiments, the client may have its own stored pages to display in response to an indication of successful login and may not need to receive pages from the server. The client computer may display an indication to the user that his or her login was successful.

The server may also log in the user to allow the user to access the resource 430. Logging in may be performed using a variety of techniques. In one embodiment, the server may return the resource 430 immediately (e.g., if the resource is a file or web page the server may simply send it to the client). In one embodiment, the server may send an indication or token to the client computer indicating a successful login so that the client computer may present the indication/token whenever it wishes to access the resource 430. In some embodiments, the server may send a session management cookie to the client computer so that the client computer may present the session management cookie to prove that it has logged in. When a client presents the session management cookie to a server, the server may provide access to a resource 430. In some embodiments, the server may store a flag or other indication of the client computer identity (e.g., an IP address, user ID, or other identifier) so that the server may provide access to the resource 430 in response to requests from this particular client computer.

Although verification steps 503a and 503b are shown occurring in series in the example 500, it should be understood that multiple verification steps may occur in parallel in some embodiments.

Also, as described above, some embodiments may operate over the World Wide Web (WWW), and the password entry form may be a web page. In some embodiments, submission of the password and/or user ID to the server for verification and receipt of an indication from the server that the login succeeded or failed may cause the display of a new webpage on the client. For example, after checking the password, the server may send a new webpage to the client indicating that the login either succeeded or failed. The client may load and display the new webpage. However, in other embodiments, the submission of the password and/or user ID to the server and receipt of an indication of successful or failed login from the server may occur asynchronously. In the WWW context, the term "asynchronously" means that data is transmitted or received in the background without reloading the current webpage or loading a new webpage. Thus, the client may display a password entry form webpage, and may submit a password and/or user ID to the server asynchronously without disturbing the display of the password entry form webpage. The client may continue to accept user edits to the password field and/or user ID field of the password entry form webpage and update the displayed contents of those fields in response to user edits, all while the server receives the submitted password and/or user ID and verifies their correctness. When the server transmits an indication of login success or failure to the client, the client may receive the indication asynchronously and optionally display an indication of the login success or failure on the password entry form webpage without reloading the webpage or loading a new webpage. In other cases, the server may send an indication of successful login in the form of a new web page that allows the user to access a desired website. The client computer may display the new web page allowing the user to access the desired website.

One technique for asynchronous webpages is Asynchronous Javascript and XML (AJAX), which comprises a group of related technologies used for asynchronous communications on the web. Using AJAX, a website may include scripting code that transmits data asynchronously from the client to the server without changing the currently displayed webpage on the client. Similarly, the scripting code may receive data from the server and update the currently displayed webpage on the client without either reloading the webpage or loading a new webpage.

In non-WWW embodiments as well, communications may be asynchronous in the sense that the password entry form may continue to be displayed even though the client computer has submitted a password and/or user ID for verification to the server. Transmission of the password and/or user ID to the server, and verification on the server, may occur in the background without disturbing the password entry form.

IV. Determining that a Password Submitted for Verification is Correct or Incorrect In this patent, I have described some embodiments that verify a submitted password to determine whether it matches stored password data (see, e.g., steps 205, 206, 207). Determining whether a submitted password matches stored password data may be performed in various ways.

In some embodiments, a password may be stored in plain text. That is, a computer may store the password itself. In that case, a submitted password may be compared with the stored password to determine if it is correct. The stored password may be stored in a database and may be associated with a user's account in the database (such as database 450). Thus, after a user submits his or her user ID as part of the password entry form, a computer may look up the plaintext password using the user ID and compare the submitted password with the stored password.

However, storing passwords is often a bad idea because hackers may infiltrate the system and thereby steal large numbers of passwords. Therefore, some embodiments instead store a hash of the password or a hash of another value based on the password.

In some embodiments, a computer system may store a hash of the password in, or linked to, the user's account in a database. A hash is a function that is easy to compute in one direction (e.g., computing hash(X) is easy), but where it is believed to be difficult to compute the input to the hash given the output of the hash (e.g., given Y, it is believed to be difficult to determine X such that hash(X)=Y). Examples of hashes are MD5, SHA-1, SHA-256, SHA-512, SHA-3, bcrypt, PBKDF1, PBKDF2, and so forth.

Thus, a computer may submit the contents of a password field and/or user ID field for password verification. The user ID may be used to access a database and retrieve a hashed password associated with the user's account in the database. Then the computer may compute a hash of the submitted contents of the password field and compare it against the stored hashed password. If the hashes match, then the computer may determine that the contents of the password field match the user's password and log in the user. If the hashes do not match, then the computer may determine that the contents of the password field do not match the user's password and decline to log in the user.

One downside of storing hashes of passwords is that some hackers have developed tables of the hash results for common passwords for a given hash function. Thus, it may be easy for a hacker to look up the resulting hash for the common password "password1" for a given hash function. As a result, it may be advantageous to use a salt. A salt is a value that is added to a password, or the result of a function computed on the password, before the hash is performed. A different salt may be used for different users, though that is not necessarily the case. A salt may be chosen arbitrarily, randomly, or by some other mechanism. The "adding" of the salt may occur in various ways: for example, the salt may be pre-pended or appended, dispersed throughout the password, added by performing a numerical addition based on a numerical interpretation of the password and salt, or by other mechanisms. By using a salt, hackers can no longer effectively use known tables of hash outputs because the salt causes the hash outputs to be different.

In some embodiments, a computer system may store a hash of the password and a salt in, or linked to, the user's account in a database.

Thus, a computer may submit the contents of a password field and/or user ID field for password verification. The user ID field may be used to access a database and retrieve a salt and a hashed password (where the salt was applied to the hash) associated with the user's account in the database. The computer may add the salt to the contents of the password field or a function computed on the contents of the password field and compute a hash of the resulting value. For example, in one embodiment, the computer may compute hash(password+salt) where "password" denotes the contents of the password field. In another embodiment, the computer may compute hash(F(password)+salt), where F( ) is a function. For example, F( ) may be the hash function so that hash (hash(password)+salt) is computed. The computer may compare the computed hash value with the stored hashed password and determine whether there was a match.

With use of the salt, the stored hashed password would typically have applied the salt in the same way that the salt is applied during the log in process. For example, after a user sets his or her password during configuration, the stored hashed password may be the computation hash(password+salt), hash(F(password)+salt), or the hash function computed based on the password and salt in some other manner. The results of the computation may be stored as the hashed password associated with the user's account in a database. The salt may also be stored associated with the user's account in the database.

Thus, if the computer determines that the hash computed on the contents of the password field (with added salt) matches the stored hashed password, then the computer may log in the user. If the computer determines that there is no match, then the computer may decline to log in the user.

V. Optional Countermeasures Against Erroneous Password Submissions

If there are many erroneous password submissions, it may indicate that a hacker is trying to access a user's account by guessing the user's password and/or user ID. Some embodiments may take countermeasures when a computer system recognizes a pattern of suspicious activity that may indicate attempted hacking. One desirable feature of a system of countermeasures is to detect and counteract hacking but not disrupt ordinary users, insofar as possible.

In some embodiments, a computer may track the number of erroneous password submissions made. The computer may count the number of erroneous password submissions made over a period of time or over a single session. The computer may count both erroneous manual and automatic submissions in its count of erroneous submissions. If the count exceeds a threshold, then countermeasures may be taken. Although, in some embodiments, it may be expected to have some automatic submissions that are erroneous because the automatic submissions might come before the user has completed entry of the password, a computer may be able to set an appropriately high threshold that would screen out hackers and not disrupt ordinary users, in many cases.

In other embodiments, a computer may track the number of erroneous submissions made that are manual submissions (but not automatic submissions). The computer may count the number of erroneous password submissions made over a period of time or over a single session. If the count exceeds a threshold, then countermeasures may be taken.

In other embodiments, a computer may maintain a separate count of erroneous manual submissions and erroneous automatic submissions. The computer may count the number of erroneous password submissions made over a period of time or over a single session. The computer may have a separate threshold for erroneous manual submission and a separate threshold for erroneous automatic submission that would trigger countermeasures. Alternatively or in addition, the computer may combine the counter of erroneous manual submissions and erroneous automatic submissions in order to determine whether to take countermeasures. For example, the computer may add the two counts or take a weighted average of the two counts and compare it against a threshold to determine whether to apply countermeasures.

In some embodiments, a computer may track the amount of time that a user has spent submitting passwords and may trigger countermeasures if the time exceeds a threshold. For example, the computer may count the amount of time that has elapsed since the user made his first submission of a password (e.g., within the current session or within a time period such as the last 24 hours or this week) and compare it against a threshold. In some embodiments, the counter may be reset when the user successfully logs in, so that the counter would count the amount of time elapsed where the user has submitted only incorrect passwords.

In some embodiments, a computer may track the number of times a user has re-typed or edited the contents of a password field on the password form. If there are many re-types or edits, then it may indicate a hacking attempt. Thus, the computer may compare a counter of re-types or edits against a threshold and trigger countermeasures if the threshold is exceeded.

The above paragraphs have described exemplary methods of detecting suspicious activity so as to determine when to trigger countermeasures. Some exemplary countermeasures that may be taken include (a) locking the user's account so that he or she cannot login, until the user presents additional authenticating information such as answering security questions, presenting additional passwords or biometric information, making a telephone call to verify his or her identity, or so forth, (b) forcing the user to change his or her password, (c) notifying the user that there has been suspicious activity, such as by sending the user an electronic message, and other possible countermeasures.

The aforementioned methods of detecting suspicious activity and using countermeasures may be performed on a local or server computer. Also, these methods are not exclusive but may be combined with each other and may be combined with other methods of detecting suspicious activity and other countermeasures.

VI. Optional Methods of Limiting Automatic Submissions

Some embodiments may optionally limit the number of automatic ("without additional user input") submissions of the password field and/or user ID field performed. Some embodiments may benefit from limiting the number of automatic submissions performed for any of the following exemplary reasons (a) limiting the number of times the password verification process must be performed, which may be helpful if it is computationally intensive or if there are many users trying to login, (b) in network embodiments, limiting the amount of network traffic sent from the client computer to a server, which may help decrease network congestion, (c) in network embodiments, it may also be desirable to limit the amount of network traffic so as to limit the number of encrypted messages containing slight variations of the user's passwords that may be intercepted by a hacker—some encryption systems might be vulnerable if a hacker obtains many encrypted messages where the plaintext message varies only slightly, and (d) any other potential advantages. However, not all embodiments would obtain or need these benefits.

In some embodiments, a computer may set a threshold that acts as a cap on the number of automatic submissions of the password and/or user ID fields. For example, a computer may set a threshold of at most 5 automatic submissions. Other thresholds may be used such as 1, 2, 3, 4, 6, 7, 8, 9, 10, and so forth. When the threshold has been met, the computer may cease to perform additional automatic submissions.

In some embodiments, a computer may require that the contents of the password field differ more than a certain amount from the last automatic submission before allowing an automatic submission. Some embodiments may measure the difference between text strings using an edit distance. An edit distance measures the number of edits that must be made to a text string to turn it into another text string. Thus, if the contents of the password field differ by a certain amount from the last automatic submission, then it may be submitted, but if it does not, then (in this example) it would not be submitted.

VII. Optional Methods of Obfuscating Automatically or Manually Submitted Passwords Some embodiments may optionally include additional methods for obfuscating automatically or manually submitted passwords. The methods of automatic submission of passwords described above may lead to many more password submissions that systems that only use manual submission of passwords. Also, the automatic submission may lead to many short fragments of the password are submitted.

Even if the password and password fragment submissions are encrypted, the large number of submissions and the short length of the submissions could possibly make the system more vulnerable to hacking and reverse engineering of the password in a network environment, under some password systems. As a countermeasure, some embodiments may add padding into the password and password fragment submissions to make the encrypted message longer and additionally obfuscated. The padding may be, for example, added before, after, or interleaved with the content of the submission.

For example, suppose that the user's password is "catdogmouse." Assume that the user enters "catd" into the password field and then an automatic submission is triggered. To provide additional protection over just sending an encryption of "catd," padding may be added. In some embodiments, padding may be a previously defined code such as "1010." Adding the padding to the password fragment may yield "1010catd," which may be encrypted and transmitted. Padding does not need to be predefined and could instead be variable. For example, if a client and server have an encrypted communications channel, then they may use the encrypted channel to agree on padding. In some cases, the encryption key or a value generated from the encryption key can be used as padding. Padding can also be interleaved in the password or password fragment, such as "c1a0t1d0" for example, or could be placed after the password or password fragment The computer that receives the padded submission may remove the padding from the submission before verifying the correctness of the submitted password or password fragment. If the padding is predefined, or if the padding is variable but the computer is able to compute the padding, then the computer can identify and subtract out the padding from the submission.

VIII. Exemplary Embodiments

This section lists some additional exemplary embodiments. The following are examples only and are non-limiting.

| Some Example Embodiments |
|---|
| a) A computer-implemented method for submitting and checking a password without additional user input, the method comprising: presenting a password entry form to a user, the password entry form having a text field for entering a password; wherein the password entry form is configured to accept passwords of a set length; detecting text input from the user; in response to detecting the text input from the user, displaying text characters in the text field; in response to the user entering a text string of the set length in the text field, submitting the contents of the text field for password verification; wherein the step of submitting the contents of the text field for password verification occurs without additional user input besides the user entering or deleting text characters in the text field; determining that the text submitted for verification is a correct password of the user, logging in the user to provide access to a protected computer resource, and notifying the user that he or she is logged in. |
| b) A computer-implemented method for submitting and checking a password without additional user input, the method comprising: presenting a password entry form to a user, the password entry form having a text field for entering a password; wherein the password entry form is configured to accept passwords of a set length; detecting text input from the user; in response to detecting the text input from the user, displaying text characters in the text field; in response to the user entering a text string of the set length in the |

| Some Example Embodiments |
| --- | text field, submitting the contents of the text field for password verification; wherein the step of submitting the contents of the text field for password verification occurs without additional user input besides the user entering or deleting text characters in the text field; determining that the text submitted for verification is a correct password of the user by:
retrieving a stored salt, adding the stored salt to the text submitted for verification or a function computed on the text submitted for verification and computing a hash of the result, comparing the resulting hash with a hash stored associated with an account of the user in a database, and determining that the hashes match;
in response to determining that the text submitted for verification is a correct password of the user, logging in the user to provide access to a protected computer resource, and notifying the user that he or she is logged in.

c) A computer-implemented method for submitting and checking a password without additional user input, the method comprising:
presenting a password entry form to a user, the password entry form having a text field for entering a password;
wherein the password entry form is configured to accept passwords of variable length;
detecting text input from the user;
in response to detecting the text input from the user, displaying text characters in the text field;
in response to the user entering or deleting text characters in the text field, submitting the contents of the text field for password verification; wherein the step of submitting the contents of the text field for password verification occurs without additional user input besides the user entering or deleting text characters in the text field; wherein the step of submitting the contents of the text field for password verification is performed repeatedly in response to the user changing the contents of the text field and is performed at least once before the user has completed entry of the password in the text field; at a first time, determining that a password submitted for verification is not a correct password of the user and not providing access to a protected computer resource; at a second time, determining that a password submitted for verification is a correct password of the user, logging in the user to provide access to the protected computer resource, and notifying the user that he or she is logged in; wherein the steps of detecting text input from the user and, in response to detecting the text input from the user, displaying text characters in the text field, are capable of occurring in parallel with the step of determining a password submitted for verification is not a correct password of the user or determining that a password submitted for verification is a correct password of the user.

d) The method of embodiment (c) further comprising checking that a threshold time has elapsed from the most recent entry or deletion of a text character in the text field before performing the step of, in response to the user entering or deleting text characters in the text field, submitting the contents of the text field for password verification.

e) The method of embodiment (c) further comprising: checking that a threshold time has elapsed from the most recent entry or deletion of a text character in the text field before performing the step of, in response to the user entering or deleting text characters in the text field, submitting the contents of the text field for password verification; and checking that the contents of the text field meet or exceed a threshold length before performing the step of, in response to the user entering or deleting text characters in the text field, submitting the contents of the text field for password verification.

f) A computer-implemented method for submitting and checking a password without additional user input, the method comprising: presenting a password entry form to a user, the password entry form having a text field for entering a password;
wherein the password entry form is configured to accept passwords of variable length;
detecting text input from the user;
in response to detecting the text input from the user, displaying text characters in the text field;
in response to the user entering or deleting text characters in the text field, submitting the contents of the text field for password verification; wherein
the step of submitting the contents of the text field for password verification occurs without additional user input besides the user entering or deleting text characters in the text field;

wherein the step of submitting the contents of the text field for password verification is performed repeatedly in response to the user changing the contents of the text field and is performed at least once before the user has completed entry of the password in the text field; at a first time, determining that a password submitted for verification is not a correct password of the user by:
retrieving a stored salt, adding the stored salt to the password submitted for verification or a function computed on the password submitted for verification and computing a hash of the result, comparing the resulting hash with a hash stored associated with an account of the user in a database, and determining that the hashes do not match;
in response to determining that a password submitted for verification is not a correct password of the user, denying access to a protected computer resource; at a second time, determining that a password submitted for verification is a correct password of the user by:
retrieving the stored salt, adding the stored salt to the password submitted for verification or a function computed on the password submitted for verification and computing a hash of the result, comparing the resulting hash with a hash stored associated with an account of the user in a database, and determining that the hashes match; and in response to determining that a password submitted for verification is a correct password of the user, logging in the user to provide access to the protected computer resource, and notifying the user that he or she is logged in;
wherein the steps of detecting text input from the user and, in response to detecting the text input from the user, displaying text characters in the text field, are capable of occurring in parallel with the step of determining that a password submitted for verification is not a correct password of the user or determining that a password submitted for verification is a correct password of the user.

g) The method of embodiment (f) further comprising checking that a threshold time has elapsed from the most recent entry or deletion of a text character in the text field before performing the step of, in response to the user entering or deleting text characters in the text field, submitting the contents of the text field for password verification.

h) The method of embodiment (f) further comprising: checking that a threshold time has elapsed from the most recent entry or deletion of a text character in the text field before performing the step of, in response to the user entering or deleting text characters in the text field, submitting the contents of the text field for password verification; and checking that the contents of the text field meet or exceed a threshold length before performing the step of, in response to the user entering or deleting text characters in the text field, submitting the contents of the text field for password verification.

i) A non-transitory computer-readable medium containing instructions for submitting and checking a password without additional input, the non-transitory computer-readable medium comprising:
instructions for presenting a password entry form to a user, the password entry form having a text field for entering a password;
wherein the password entry form is configured to accept passwords of variable length;
instructions for detecting text input from the user; instructions for, in response to detecting the text input from the user, displaying text characters in the text field; instructions for, in response to the user entering or deleting text characters in the text field, submitting the contents of the text field for password verification; wherein the instructions for submitting the contents of the text field for password verification include instructions for submitting the contents of the text field for password verification without additional user input besides the user entering or deleting text characters in the text field; wherein the instructions for the submitting the contents of the text field for password verification further include:
instructions for, in response to the user changing the contents of the text field, repeatedly submitting the contents of the text field for password verification, and
instructions for submitting the contents of the text field for password verification before the user has completed entry of the password in the text field;
instructions for determining that a password submitted for verification is not a correct password of the user by:
retrieving a stored salt, adding the stored salt to the password

| Some Example Embodiments |
| --- |
| submitted for verification or a function computed on the password submitted for verification and computing a hash of the result, comparing the resulting hash with a hash stored associated with an account of the user in a database, and determining that the hashes do not match; instructions for, in response to determining that a password submitted for verification is not a correct password of the user, denying access to a protected computer resource; instructions for determining that a password submitted for verification is a correct password of the user by: retrieving the stored salt, adding the stored salt to the password submitted for verification or a function computed on the password submitted for verification and computing a hash of the result, comparing the resulting hash with a hash stored associated with an account of the user in a database, and determining that the hashes match; instructions for, in response to determining that a password submitted for verification is a correct password of the user, logging in the user to provide access to the protected computer resource, and notifying the user that he or she is logged in; instructions for determining whether a password submitted for verification is correct or not in parallel with continuing to receive text input from the user and updating the contents of the text field in response to the received text input. |
| j) Computer readable mediums containing instructions for performing the above methods |

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method for submitting and checking a password without additional user input, the method comprising:
presenting a password entry form to a user, the password entry form having a text field for entering a password;
wherein the password entry form is configured to accept passwords of variable length;
detecting text input from the user;
in response to detecting the text input from the user, displaying text characters in the text field;
in response to the user entering text characters in the text field, submitting the contents of the text field for password verification;
wherein the step of submitting the contents of the text field for password verification occurs without additional user input besides the user entering text characters in the text field;
wherein the step of submitting the contents of the text field for password verification is performed repeatedly in response to the user changing the contents of the text field and is performed at least once before the user has completed entry of the password in the text field;
at a first time, determining that a password submitted for verification is not a correct password of the user by retrieving a stored salt, adding the stored salt to the password submitted for verification or a function computed on the password submitted for verification and computing a hash of the result, comparing the resulting hash with a hash stored associated with an account of the user in a database, and determining that the hashes do not match;
in response to determining that a password submitted for verification is not a correct password of the user, denying access to a protected computer resource;
at a second time, determining that a password submitted for verification is a correct password of the user by retrieving the stored salt, adding the stored salt to the password submitted for verification or a function computed on the password submitted for verification and computing a hash of the result, comparing the resulting hash with the hash stored associated with the account of the user in the database, and determining that the hashes match; and
logging in the user to provide access to the protected computer resource, and notifying the user that he or she is logged in;
wherein the steps of detecting text input from the user and, in response to detecting the text input from the user, displaying text characters in the text field, are capable of occurring in parallel with the step of determining that a password submitted for verification is a correct password of the user.

2. The method of claim 1, further comprising determining that a threshold time has elapsed from the most recent entry of a text character in the text field before performing the step of, in response to the user entering text characters in the text field, submitting the contents of the text field for password verification.

3. The method of claim 1, further comprising determining that the contents of the text field meet or exceed a threshold length before performing the step of, in response to the user entering text characters in the text field, submitting the contents of the text field for password verification.

4. The method of claim 1, further comprising adding padding to the contents of the text field and encrypting the contents of the text field, prior to submitting the contents of the text field for password verification.

5. The method of claim 1, wherein the step of presenting a password entry form to a user is performed on a client computer and the contents of the text field are submitted over a network for verification by a server computer such that the step of determining that a password submitted for verification is a correct password of the user is performed on the server computer.

6. The method of claim 1, further comprising displaying the password entry form to the user asynchronously so that submitting the contents of the text field for password verification occurs without causing reloading of the password entry form.

7. The method of claim 1, further comprising:
in response to the user deleting text characters in the text field, submitting the contents of the text field for password verification, wherein the submission of the contents of the text field for password verification occurs without additional user input besides the user deleting text characters in the text field.

8. A computer-implemented method for submitting and checking a password without additional user input, the method comprising:
presenting a password entry form to a user, the password entry form having a text field for entering a password;
wherein the password entry form is configured to accept passwords of variable length;
detecting text input from the user;
in response to detecting the text input from the user, displaying text characters in the text field;
in response to the user entering text characters in the text field, submitting the contents of the text field for password verification;

wherein the step of submitting the contents of the text field for password verification occurs without additional user input besides the user entering text characters in the text field;

wherein the step of submitting the contents of the text field for password verification is performed repeatedly in response to the user changing the contents of the text field and is performed at least once before the user has completed entry of the password in the text field;

at a first time, determining that a password submitted for verification is not a correct password of the user and not providing access to a protected computer resource;

at a second time, determining that a password submitted for verification is a correct password of the user, logging in the user to provide access to the protected computer resource, and notifying the user that he or she is logged in;

wherein the steps of detecting text input from the user and, in response to detecting the text input from the user, displaying text characters in the text field, are capable of occurring in parallel with the step of determining that a password submitted for verification is a correct password of the user.

9. The method of claim 8, further comprising determining that a threshold time has elapsed from the most recent entry of a text character in the text field before performing the step of, in response to the user entering text characters in the text field, submitting the contents of the text field for password verification.

10. The method of claim 8, further comprising determining that the contents of the text field meet or exceed a threshold length before performing the step of, in response to the user entering text characters in the text field, submitting the contents of the text field for password verification.

11. The method of claim 8, further comprising adding padding to the contents of the text field and encrypting the contents of the text field, prior to submitting the contents of the text field for password verification.

12. The method of claim 8, wherein the step of presenting a password entry form to a user is performed on a client computer and the contents of the text field are submitted over a network for verification by a server computer such that the step of determining that a password submitted for verification is a correct password of the user is performed on the server computer.

13. The method of claim 8, further comprising displaying the password entry form to the user asynchronously so that submitting the contents of the text field for password verification occurs without causing reloading of the password entry form.

14. The method of claim 8, further comprising:

in response to the user deleting text characters in the text field, submitting the contents of the text field for password verification, wherein the submission of the contents of the text field for password verification occurs without additional user input besides the user deleting text characters in the text field.

15. A non-transitory computer-readable medium containing instructions for submitting and checking a password without additional input, the non-transitory computer-readable medium comprising:

instructions for presenting a password entry form to a user, the password entry form having a text field for entering a password;

wherein the password entry form is configured to accept passwords of variable length;

instructions for detecting text input from the user;

instructions for, in response to detecting the text input from the user, displaying text characters in the text field;

instructions for, in response to the user entering text characters in the text field, submitting the contents of the text field for password verification;

wherein the instructions for submitting the contents of the text field for password verification include instructions for submitting the contents of the text field for password verification without additional user input besides the user entering text characters in the text field;

wherein the instructions for the submitting the contents of the text field for password verification further include instructions for submitting the contents of the text field for password verification before the user has completed entry of the password in the text field;

instructions for determining that a password submitted for verification is not a correct password of the user and denying access to a protected computer resource;

instructions for determining that a password submitted for verification is a correct password of the user, logging in the user to provide access to the protected computer resource, and notifying the user that he or she is logged in;

instructions for determining whether a password submitted for verification is correct or not in parallel with continuing to receive text input from the user and updating the contents of the text field in response to the received text input.

16. The non-transitory computer-readable medium of claim 15, further comprising instructions for determining that a threshold time has elapsed from the most recent entry of a text character in the text field before, in response to the user entering text characters in the text field, submitting the contents of the text field for password verification.

17. The non-transitory computer-readable medium of claim 15, further comprising instructions for determining that the contents of the text field meet or exceed a threshold length before, in response to the user entering text characters in the text field, submitting the contents of the text field for password verification.

18. The non-transitory computer-readable medium of claim 15, further comprising instructions for adding padding to the contents of the text field and encrypting the contents of the text field, prior to submitting the contents of the text field for password verification.

19. The non-transitory computer-readable medium of claim 15, further comprising instructions for displaying the password entry form to the user asynchronously so that submitting the contents of the text field for password verification occurs without causing reloading of the password entry form.

20. The non-transitory computer-readable medium of claim 15, further comprising:

instructions for detecting that the user has deleted text characters from the text field and, in response to the user deleting text characters in the text field, submitting the contents of the text field for password verification without additional user input besides the user deleting text characters in the text field.

\* \* \* \* \*

UNITED STATES PATENT AND TRADEMARK OFFICE
CERTIFICATE OF CORRECTION

PATENT NO. : 9,536,067 B1  Page 1 of 1
APPLICATION NO. : 14/588459
DATED : January 3, 2017
INVENTOR(S) : Bryant Christopher Lee It is certified that error appears in the above-identified patent and that said Letters Patent is hereby corrected as shown below:

On the Title Page

Item (62) under Related U.S. Application Data, on Line 1, "Division of" should be changed to --Provisional--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*